United States Patent [19]

Kim

[11] Patent Number: 5,857,166

[45] Date of Patent: Jan. 5, 1999

[54] TOOL MONITORING APPARATUS

[76] Inventor: Nam H. Kim, 3226 Roou the Ben, Ann Arbor, Mich. 48108

[21] Appl. No.: 918,881

[22] Filed: Aug. 26, 1997

Related U.S. Application Data

[60] Provisional application No. 60/025,821, Aug. 30, 1996.

[51] Int. Cl.$^6$ .................................................. G06F 19/00
[52] U.S. Cl. ...................................... 702/179; 364/474.17
[58] Field of Search ........................ 364/551.02, 474.16, 364/474.17, 474.11; 702/179, 182

[56] References Cited

U.S. PATENT DOCUMENTS

| | | | |
|---|---|---|---|
| 4,208,718 | 6/1980 | Chung | 364/474 |
| 4,249,243 | 2/1981 | Yoshida et al. | 364/474 |
| 4,442,494 | 4/1984 | Fromson et al. | 364/511 |
| 4,547,847 | 10/1985 | Olig et al. | 364/148 |
| 4,564,911 | 1/1986 | Smith et al. | 364/474 |
| 5,070,655 | 12/1991 | Aggarwal | 51/165.71 |
| 5,243,533 | 9/1993 | Takagi et al. | 364/474.17 |
| 5,428,556 | 6/1995 | Torizawa et al. | 364/551.02 |
| 5,568,028 | 10/1996 | Uchiyama et al. | 364/474.19 |
| 5,587,931 | 12/1996 | Jones et al. | 364/551.02 |

*Primary Examiner*—John E. Barlow, Jr.
*Assistant Examiner*—Patrick Assouad
*Attorney, Agent, or Firm*—Young & Basile, PC

[57] ABSTRACT

A method and apparatus for determining a dull/broken tool in a multi-tool spindle executing successive machine cycles. The total machine energy supplied to the spindle is determined. The average total machine energy supplied to the spindle in a plurality of successive machine cycles is also determined. The relative machine energy of the last machine cycle is determined by a ratio of the total machine energy to the average machine energy. A limit of the relative machine energy to the average total machine energy is established. The relative machine energy is compared with the limit to determine a tool condition, i.e., a broken tool. The instantaneous energy supplied to the plurality of machine tools is sampled a plurality of times during each machine cycle, and integrated to obtain the total machine energy for each machine cycle. The average total machine energy is updated with each new machine cycle over a predetermined number of most recent cycles.

12 Claims, 8 Drawing Sheets

TOOL MONITORING APPARATUS

CROSS-REFERENCED TO CO-PENDING APPLICATION

This Application claims the benefit of provisional application Ser. No. 60/025,821 filed Aug. 30, 1996, in the name of Nam H. Kim and entitled "Tool Monitoring Apparatus".

BACKGROUND OF THE INVENTION

1. Field of the Invention:

The present invention relates, in general, to machine tools and, more specifically, to tool condition monitoring apparatus.

2. Background Description:

Tool monitoring systems have been devised which measure spindle power to determine the condition of tools. Prior art power-based tool monitors compare the spindle power profile to a set of fixed trip limits to determine whether a tool is broken (missing profile) or dull (excessive profile). If the power profile fails to reach a preset limit, such as a tool presence (TPL), during a machine cycle, a broken tool condition exists. When the power profile exceeds another preset limit, i.e., a dull tool limit (DTL), a dull tool condition exists. This scheme works well if there is only one tool to be monitored. In that case, a missing tool causes a complete absence of a normal power profile.

In a multiple tool application, however, the situation is more complicated. The power profile gets smaller; but does not completely disappear when one tool is missing. Any detection schemes that have relied on the fixed tool presence limit have proven to be inadequate in multiple tool situations. As tools get dull, the spindle power usage increases. As shown in FIG. 9, the power usage of three dull tools (one is missing, i.e. broken) is greater than that of four new tools (all tools are present). Therefore, a fixed tool presence limit that works for new tools fails to work for dull tools, and vice versa. This critical inadequacy has made traditional power-based tool monitors ineffective in multiple tool applications.

Thus, it is desirable to provide a tool monitor apparatus which is capable of monitoring tool conditions, such as a broken tool or a dull tool, in the multiple tool applications. It would also be desirable to provide a tool monitor apparatus which is capable of detecting one broken tool or one dull tool with a plurality of tools and a multiple tool application.

SUMMARY OF THE INVENTION

The present invention is a method and apparatus of monitoring a tool condition in a multiple tool spindle. Specifically, the present method and apparatus determine a dull and/or broken tool in a multiple tool spindle.

The inventive method comprises the steps of:

determining total machine energy supplied to a multiple tool spindle containing a plurality of tools in each of a plurality of consecutive machine cycles;

determining the average machine energy supplied in each machine cycle over a plurality of consecutive machine cycles;

determining a relative machine energy of a last machine cycle as a ratio of total machine energy in the last machine cycle to the average machine energy;

establishing a limit of one of relative machine energy and average machine energy; and comparing one of the relative machine energy and the average machine energy with the limit to determine a condition of at least one of the tools of the plurality of tools.

By example, the step of establishing the limit further comprises the step of establishing a dull tool limit and/or a broken tool limit. Both dull tool and broken tool limits can be effectively employed at the same time. The dull tool limit is established at a maximum allowed value of the average machine energy. The broken tool limit is established at a minimum allowed value of the relative machine energy.

Further, the inventive method comprises a step of updating the average machine energy with the total machine energy generated during each successive machine cycle. Preferably, the average machine energy is calculated over a last predetermined number, such as eight, of machine cycles.

Finally, the total machine energy is determined by integrating the instantaneous machine energy supplied to the spindle at each of a plurality of samples during one machine cycle.

The present invention also comprises an apparatus for determining a machine tool condition in at least one tool of a plurality of tools in a multiple tool spindle during each of a plurality of successive machine cycles. The apparatus comprises means for determining total machine energy supplied to a plurality of machine tools in each of a plurality of consecutive machine cycles. Means are also provided for determining the average machine energy supplied in each machine cycle of a plurality of consecutive machine cycles. Means are provided for determining relative machine energy defined as a ratio of total machine energy of a most recent machine cycle to the average machine energy. Means are also provided for establishing a limit of at least one of the relative machine energy and the average machine energy. Finally, means are provided for comparing at least one of the relative machine energy and the average machine energy with the limit to determine a condition of at least one of the tools of the plurality of tools.

The present method and apparatus provide a unique monitor which is capable of determining a tool condition, such as a broken or dull tool in a multiple tool spindle. The present method and apparatus is capable of detecting the condition of any one of the tools in the multiple tool spindle. The use of the average machine energy over a predetermined number of most recent machine cycles avoids the problem of previously devised tool monitors which use a fixed limit when the actual condition of the tools gradually becomes duller during use.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENT

The tool monitoring apparatus of the present invention is designed to detect dull and broken tool(s) in multiple-spindle tool applications wherein the spindles are driven by a single drive motor. Before describing the detailed construction and operation of the present tool monitoring apparatus, the following definitions are given to provide a thorough and clear understanding of the scope and operation of the present invention.

Definitions:

TME—total machining energy, the area under the power-profile during actual machining.

ATME—average TME of the last "X" number of samples.

RME—relative machining energy, defined as: TME/ATME×100% (the percentage ratio of the new TME to the ATME or moving average of the previous "X" TME's).

MCI—machine cycle input, generated by external machine control during machining.

TL—trigger limit, the level above which the Total Machining Energy integration begins. Typically set at 2–5% above idle power.

HL—high limit, indicates a jam-up condition, nominally 20–30% above peak power.

DTL—dull tool limit, maximum allowed value of ATME, indicates a dull tool condition when ATME exceeds this limit.

BTL—broken tool limit. When the RME (TME/ATME ×100%) falls below this limit the control triggers the broken tool trip.

Figure 1:
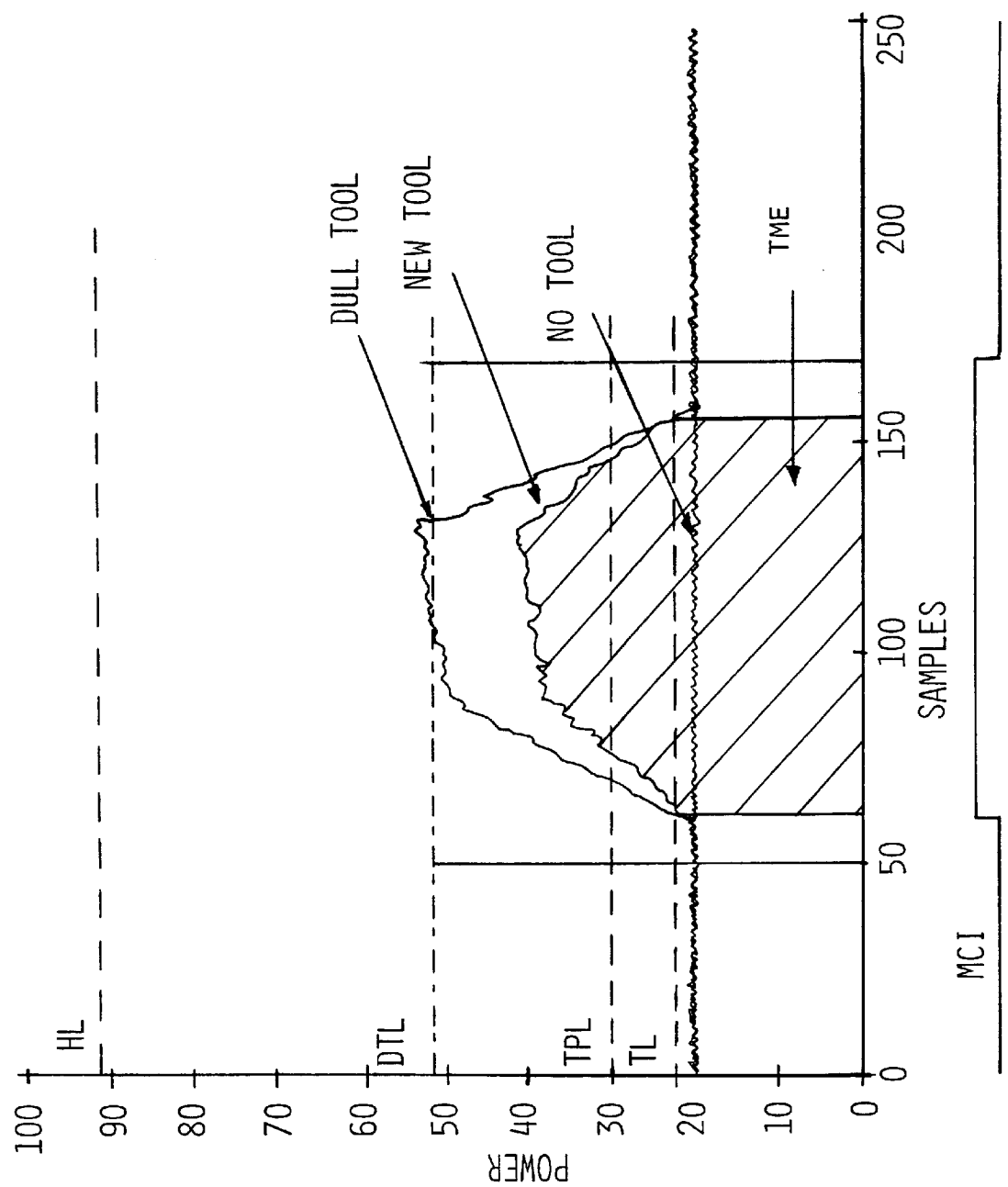
FIG. 1 is a graph depicting the general operation of the tool monitoring apparatus of the present invention.

The tool monitoring apparatus of the present invention generates a TME or total machining energy during each machine cycle as shown by the cross-hatched area in FIG. 1. The tool monitoring apparatus integrates the area under the power profile beginning when the power exceeds the user set trigger level (TL) and ending when the power drops below the trigger level.

The tool monitoring apparatus is particularly suited for applications where multiple tools, such as a plurality of drill bits, with four being used hereafter only as an example, are each driven on separate spindles, but from a single motor.

Figure 2:
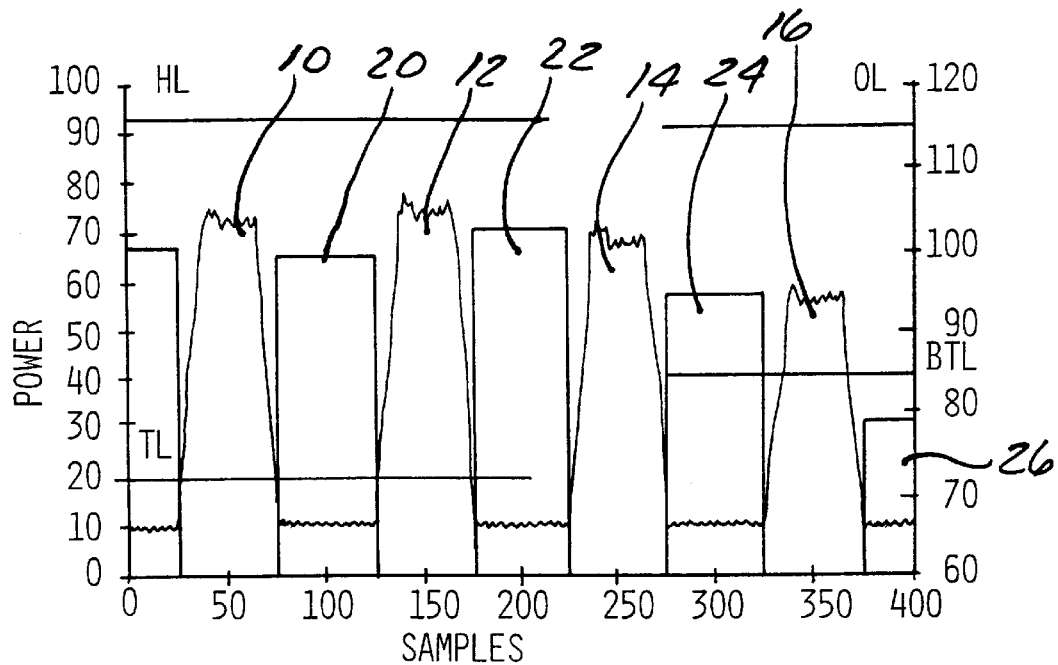
FIG. 2 is a graph depicting the tool monitoring apparatus used to monitor multiple power driven tools.
Figure 9:
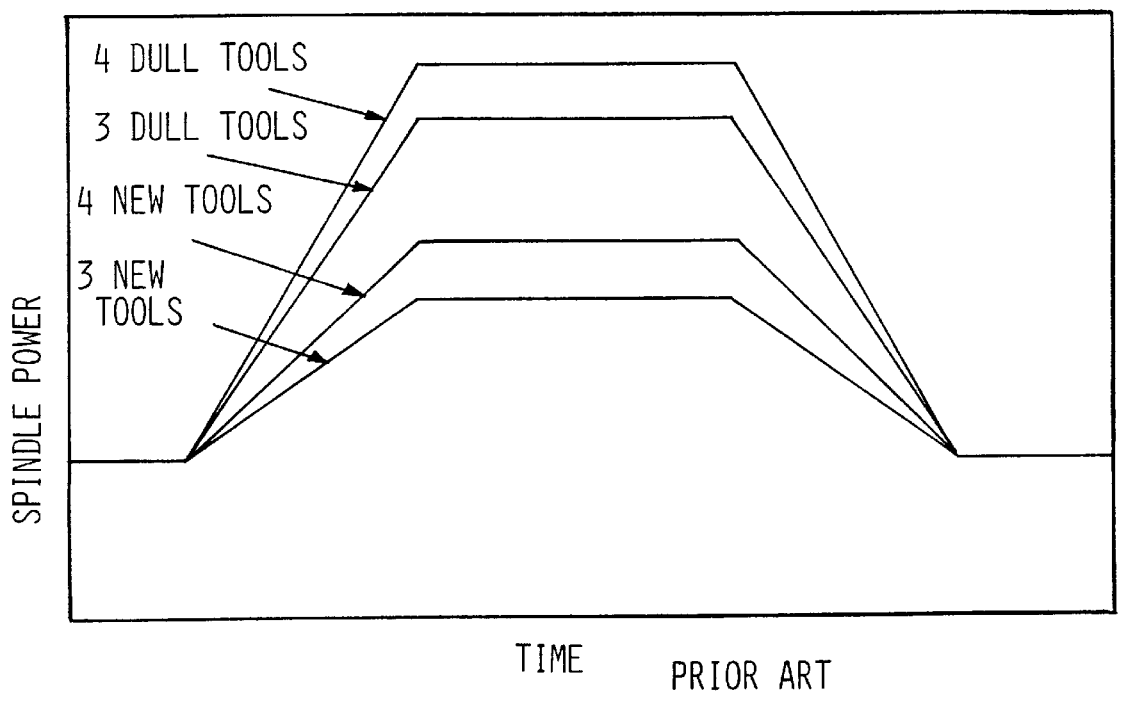
FIG. 9 is a graph depicting prior art new and dull tool power usage.

FIG. 2 depicts a graphic representation of the power profile generated by a plurality of tools, such as four in the present example. A plurality of successive machine cycles are represented by reference numerals 10, 12, 14 and 16. In the first three illustrated machine cycles 10, 12 and 14, all four tools are operating at the same time in each machine cycle. In the fourth power profile or machine cycle 16, one of the tools has broken or has been removed such that only three tools are operating during the fourth machine cycle.

After each machine cycle, the tool monitoring apparatus calculates the total machining energy or TME by integrating the power value at each sample time starting from the time when the power level exceeds the trigger level or TL and ending when the power level decreases below the trigger level (TL).

Figure 8:
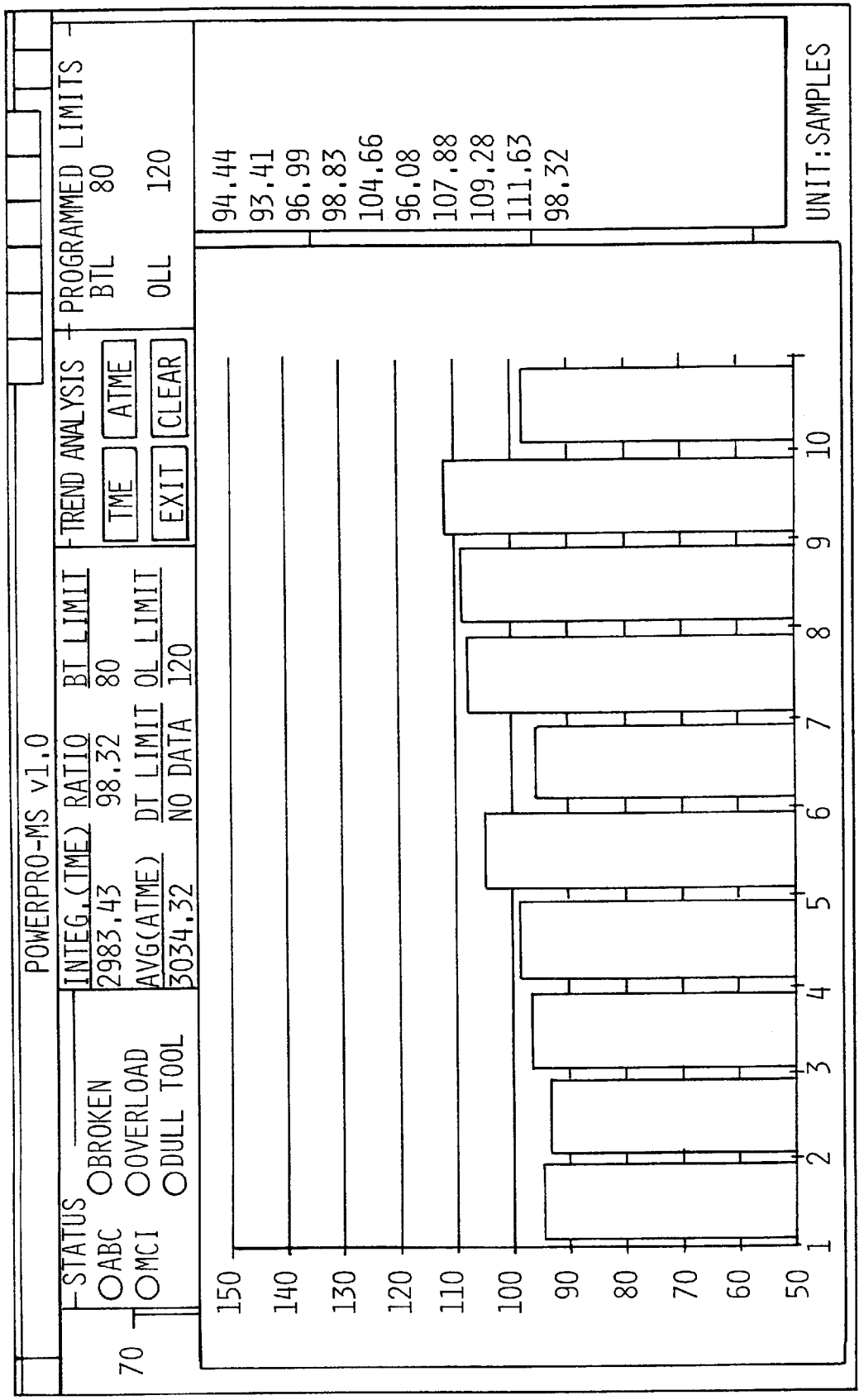

Referring briefly to FIG. 8, there is depicted an indication of the TMEs plurality of successive machine cycles as represented in both numeric and graphic form.

After each machine cycle, the tool monitoring apparatus compares the most recent TME to the ATME which is the moving average of the previous eight TMEs. It should be noted that eight is selected as an example only as the moving average can be calculated based on any number of previous TMEs. The tool monitoring apparatus then calculates the relative machine energy (RME) for the last machine cycle as shown by reference numbers 20, 22, 24 and 26. As the RME has been previously defined as the percentage ratio of the most recent TME to the ATME, a comparison of the RME with the BTL or broken tool limit as shown in FIG. 2 can easily detect a broken tool since the RME will have dropped below the programmed BTL during the fourth machine cycle.

Figure 3:
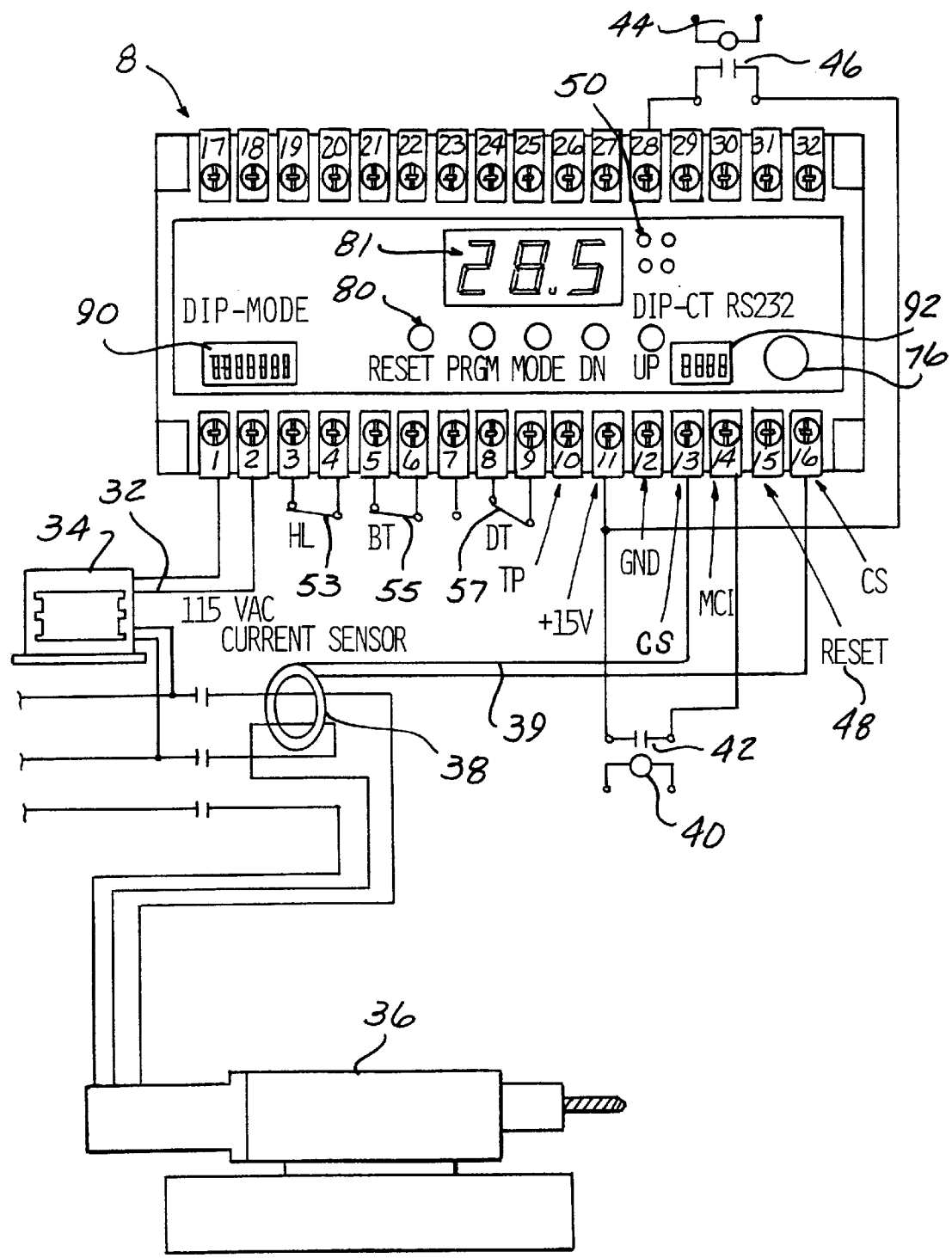
FIG. 3 is a front elevational view and a schematic diagram showing the electrical connections and front face plate of the enclosure of the tool monitoring apparatus of the present invention.
Figure 4:
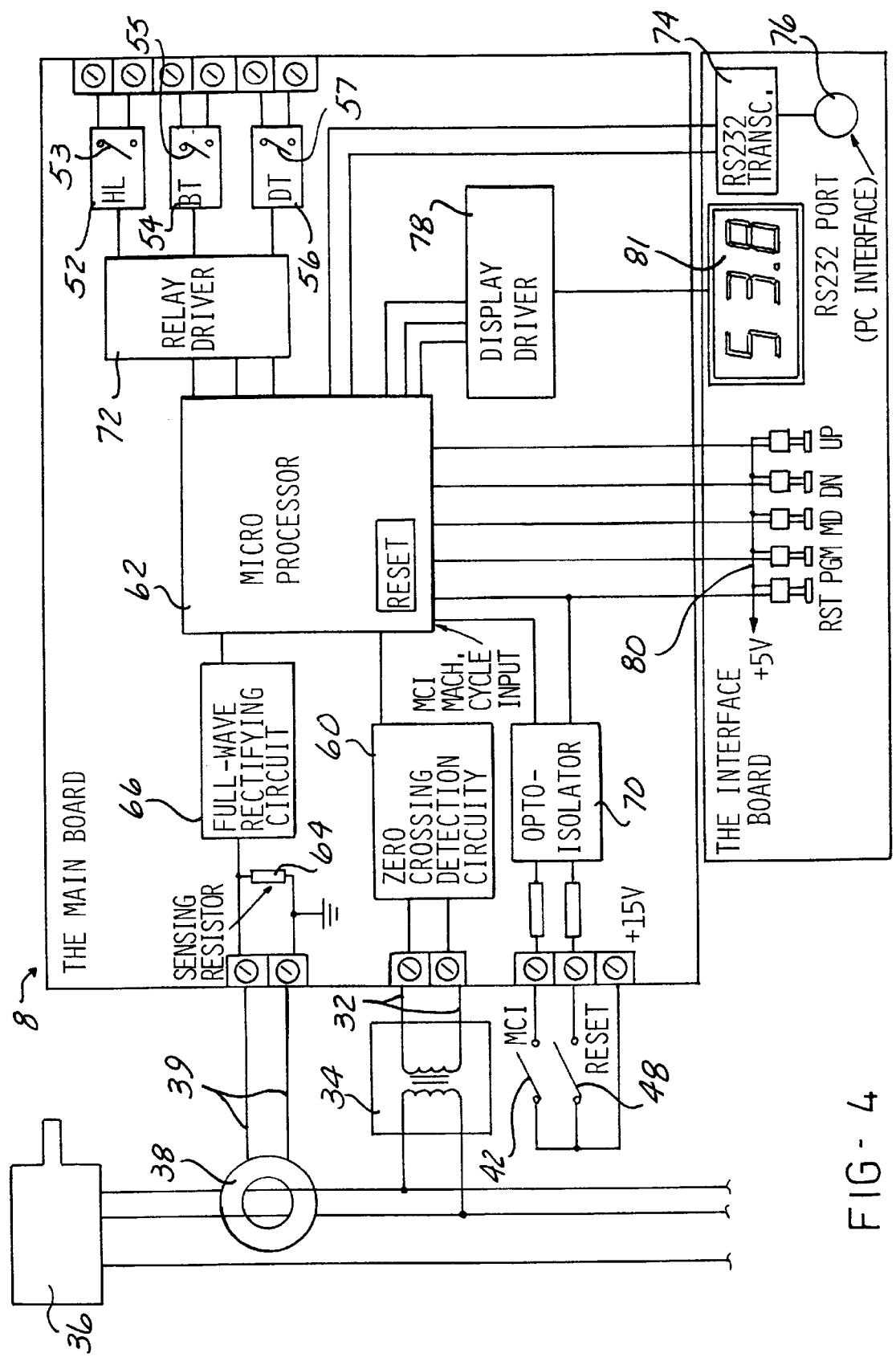
FIG. 4 is a block diagram depicting the circuitry employed in the tool monitoring apparatus shown in FIG. 3.

Referring now to FIGS. 3 and 4, there is depicted the detailed construction of the tool monitoring apparatus 8 of the present invention. FIG. 3 depicts the external electrical connections to the front face plate of the tool monitoring apparatus 8 which is typically mounted in a closed housing or enclosure. A plurality of terminals are mounted on the face plate on top and bottom edges of the housing. An external 115 V voltage input 32 is connected to the apparatus 8 from an external 115VAC control transformer 34. The transformer 34 should be the same transformer supplying three-phase power to the tool spindle 36, only one of a plurality of which is shown in FIG. 3.

A current sensor 38 typically in the form of a coil or current transformer is placed about two phases of the three-phase power, which are the same two phases to which the primary side of the 115 V control transformer is connected. The output 39 of the current sensor 38 is connected to selected terminals on the face plate of the apparatus 30.

An external machine cycle control relay 40 has a switchable contact 42 connected to two terminals on the apparatus 30 to provide the MCI input as described above.

An optional automatic background compensation relay 44 has a switchable contact 46 connected to two terminals on the apparatus 30 to provide compensation for background (idle-low) drift in the power system.

An external reset 48, shown in FIG. 4 is also connected to one of the terminals on the face plate.

A plurality of indicators, such as LEDs 50, are mounted on the face plate and used to indicate various trip status. The four LEDs shown in FIG. 3 respectively represent, when activated or turned on, a closed HL, a closed BT, a tripped DT and a TP "on" condition.

Referring briefly to both FIGS. 3 and 4, the apparatus 8 includes three internal switches or relays 52, 54 and 56. The first relay 52 designated HL has a switchable contact 53 connected to external circuits which can be used to stop the spindle and/or speed immediately when a jam up is detected.

Similarly, the second relay 54 labeled "BT" has a switchable contact 55 which can also be connected to external circuitry to provide a visible indication or to take immediate action upon detecting a broken tool. Finally, the third relay 56 labeled "DT" has a switchable contact 57 which can be connected to external circuitry to take appropriate action upon a dull tool indication from the tool monitoring apparatus 8.

Referring now to FIG. 4, a zero crossing detection circuit 60 is connected to the 115 V power input terminals and provides an output indicative of a zero voltage crossing input condition to a processor or CPU 62. Preferably, the CPU 62 is, by way of example only, a Motorola MC6811C11 microprocessor having onboard memory and analog/digital signal conversion circuits.

The outputs 39 of the current sensor 38 are connected through a sensing resistor 64 to a full wave rectifying circuit 66. The output of the full wave rectifying circuit 66 supplies a full wave rectified current wave form to the analog/digital input pin of the CPU 62.

The remote or external MCI input 42 and reset input 48 are connected to the CPU 62 via an opto-isolator 70.

The CPU 62 drives a number of outputs. A relay driver circuit 72 is connected to various output pins of the CPU 62 to individually drive the relays 52, 54 and 56 as described above.

An RS232 transceiver 74 is mounted on an interface board and connected to an RS232 connector 76 mounted on the face plate of the apparatus 8. The transceiver 74 provides bi-directional communication between the CPU 62 and an external processor or computer, not shown.

The CPU 62 also supplies an output to a display driver 78 which drives a display 81, such as an LED display 81 mounted on the face plate. During normal operation, the display 81 displays a numeric value or number directly proportional to the current motor power usage. The displayed numeric value is equal to a percentage of the full scale power and not the actual power magnitude.

A plurality of input switches or buttons, all denoted by reference number 80 in FIGS. 3 and 4, are mounted on the face plate. The buttons or switches 80 provide various programming functions, such as reset, program, mode, down and up. The up or down buttons are used to change the normal state of one element, such as one of the relays 52, 54 and 56 from "on" to "off" or vice-versa.

When the buttons 80 are used to program the apparatus 8, various symbols will be displayed on the display 81 enabling the programmer to establish various power levels for BT relay trip, a trip delay time for the HL relay output, the numeric value of the trigger level (TL), and numeric values for the broken tool limit (BTL), the overload limit (OL), and the high limit (HL).

As also shown in FIG. 3, a series of dip switches labeled "DIP-MODE" 90 provide various inputs to the CPU 62 for use in selecting various operation features or to input parameters. A separate series of switches 92, labeled "DIP-CT", are used to select the sensitivity of the current sensor transformer 38.

The CPU 62 executes a control program used to control the operation of the apparatus 8 as well as enabling programming of various limits. The control program can be loaded as well as modified via a connection to an external processor, such as a personal computer, etc. through a bi-directional RS232 link. A software program run on the external processor generates screen displays useful in programming the apparatus 8, displaying various values, downloading all trip parameters, etc.

Figure 5:
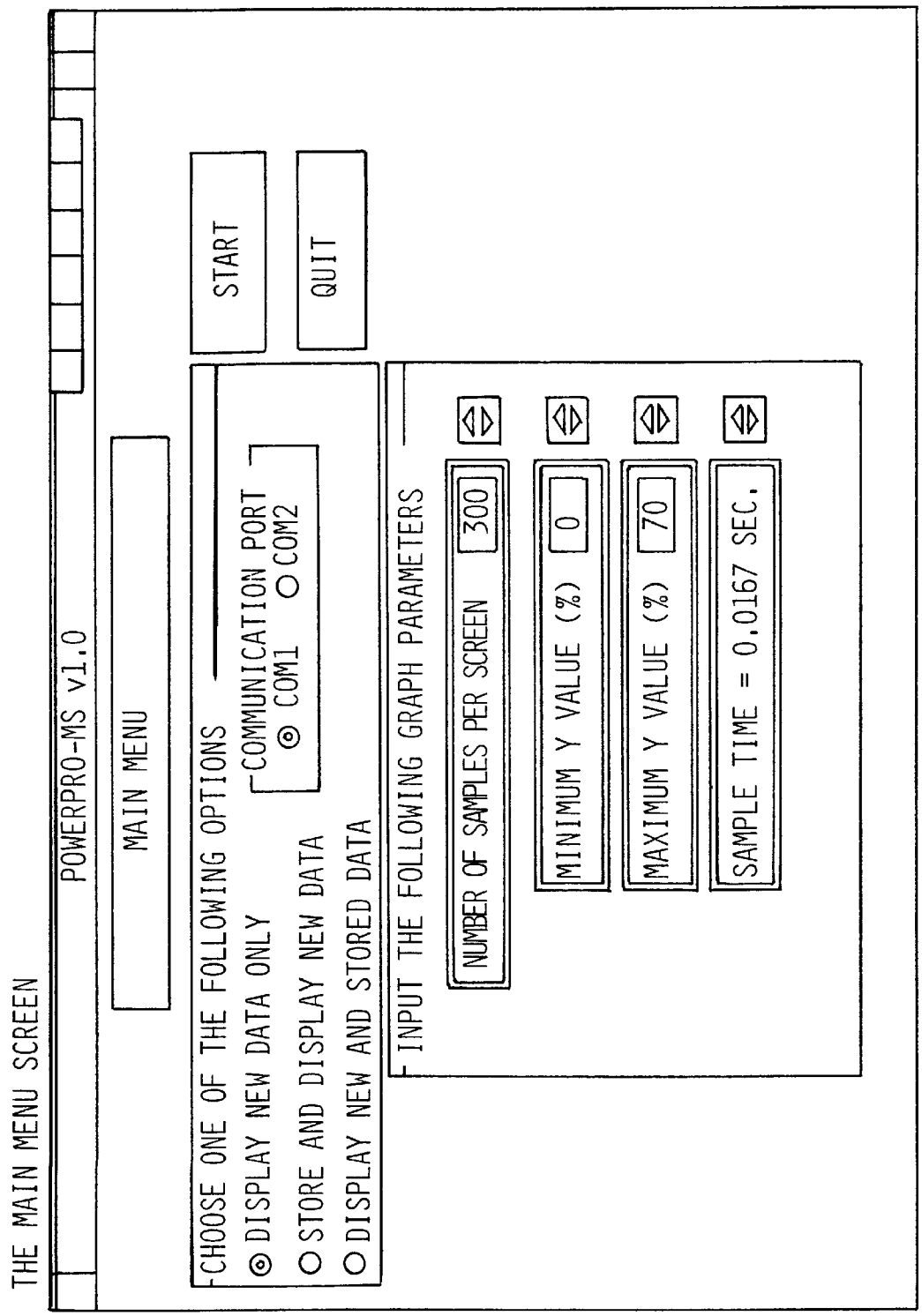
FIGS. 5–8 are screen displays generated by a software program that communicates with the tool monitoring apparatus of the present invention.
Figure 6:
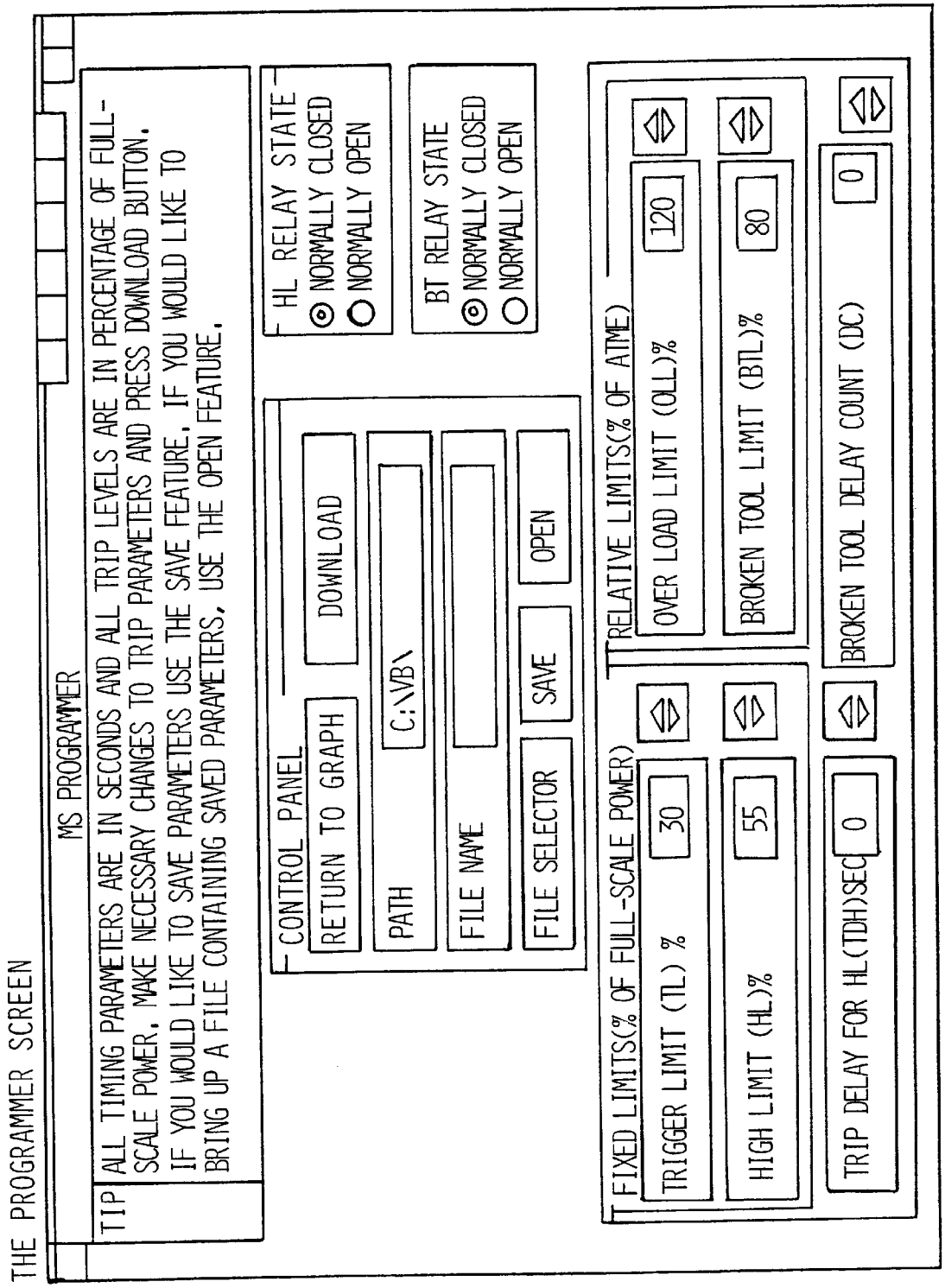

FIG. 5 depicts a first screen labeled "Main Menu" which indicates the various status values for the particular application of the apparatus 8. When the program button 80 is depressed on the face plate of the apparatus 8, the control program generates a programmer screen shown in FIG. 6 which depicts the numeric values for the various limits, such as TL, HL, BTL, OL, and trip delay for HL. Any of these values can be entered or revised via the external processor.

Figure 7:
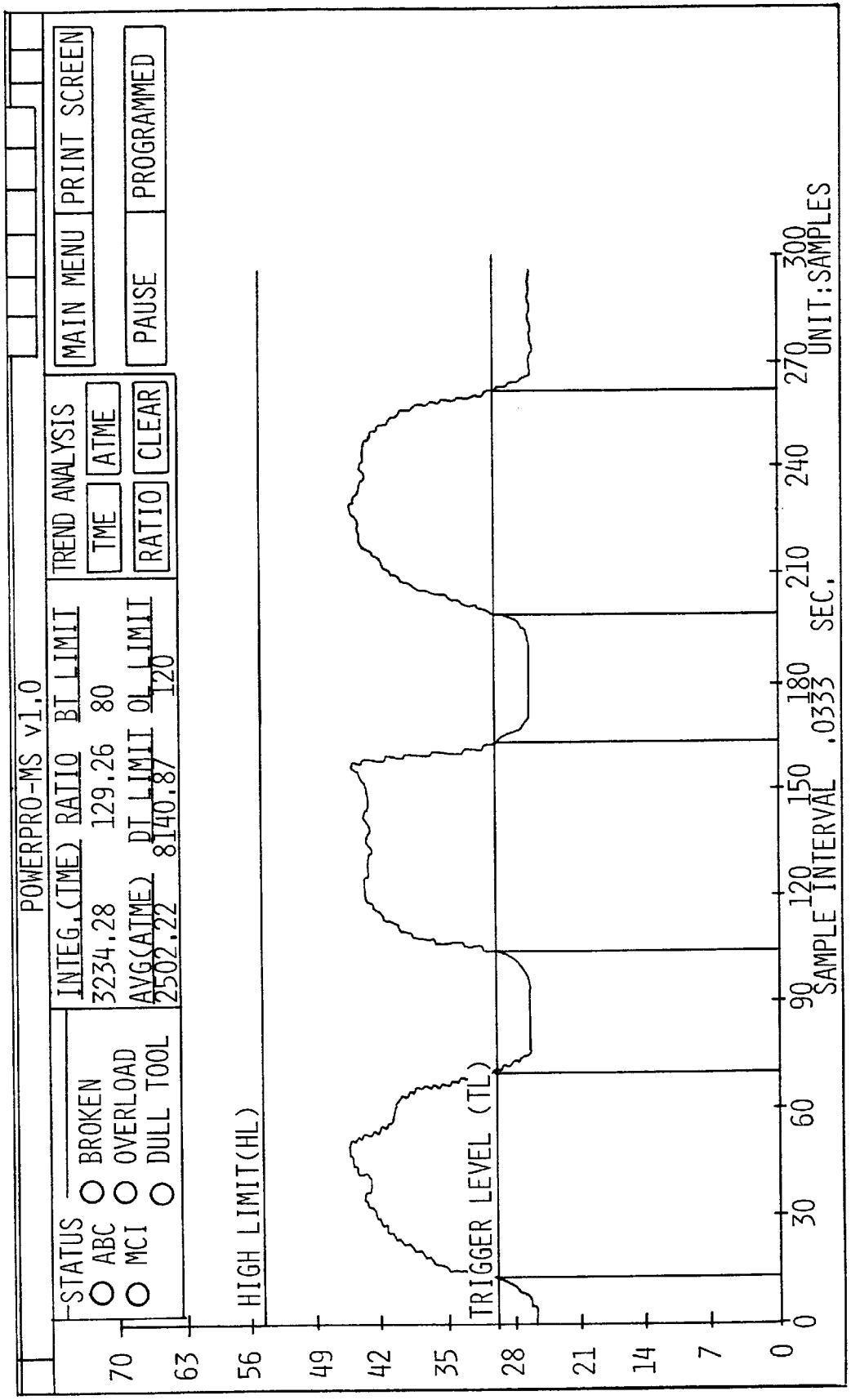

At any time during use of the apparatus 8, the control program, upon suitable input signals, can generate a power profile graph shown in FIG. 7. This enables the user to view the spindle power profile in real time.

A trend analysis screen shown in FIG. 8 is also selectible and provides the numeric values for the last series of TMEs as well as a graphic bar display of the TME values. The trend analysis screen can also display the last series of RMEs and ATMEs in the same format.

In general, the control program operates in the following manner. A main voltage cycle is determined by the period of the motor line voltage (for 60 Hz, the cycle time is 16.67 ms). A new cycle is triggered by the rising edge of the zero-crossing circuit output converted from the sinusoidal wave form of the line voltage into a square wave form. After receiving the rising edge signal, the control program waits for the zero-crossing (minimum point) of the full-wave rectified current signal. The time interval between the voltage zero-crossing and the current zero-crossing corresponds to the phase angle between the voltage and current. The phase angle, in turn, determines the power factor of the control power. The control program accumulates a current wave form and multiplies it by the power factor to compute a new power sample during each cycle.

After each power sample is computed, the control program checks to see if there has been a change in the state of the machine cycle input (MCI). The control program updates the total machining energy (TME) if the machine cycle input is "on" and the power level exceeds the trigger limit (TL). The control program then checks the sample to determine if the instantaneous jam up limit (HL) has been exceeded. If it has, the control program trips the HL relay 52. The control program sends new power sample and system status data (trip states, trip limits, etc.) to the RS232 transceiver for transmission to an external processor. After all data has been updated and potentially transmitted, the control program waits for the next voltage crossing or current.

After determining the end of each machine cycle input (MCI) that is, the MCI signal turns off, the control program computes the final value of TME. The control program then goes through a series of tests to determine:

1. Is the RME (relative TME/ATME×100%) below the BTL or above the HL? If this occurs, the control program trips the BT relay 54.
2. Does the average total machining energy (ATME) or moving average of the previous eight ATMEs exceed the dull tool limit (DTL)? If so, the processor 62 trips the DT relay 56.
3. If none of these events occur, the control program updates the ATME, discarding the oldest of the eight previous TME values and updates the average with the most recent or newest TME value.

The control program then reinitializes the TME and all trip state indicators and waits for a new MCI signal.

What is claimed:

1. A method for detecting a tool condition in a multiple tool spindle, the method comprising the steps of:

determining total machine energy supplied to a multiple tool spindle containing a plurality of tools in each of a plurality of machine cycles;

determining the average machine energy supplied over a plurality of consecutive machine cycles;

determining a relative machine energy of a most recent machine cycle as a ratio of total machine energy in the most recent machine cycle to the average machine energy;

establishing a limit of relative machine energy to average machine energy; and comparing one of the relative machine energy and the average machine energy with the limit to determine a condition of at least one of the tools of the plurality of tools.

2. The method of claim 1 wherein the step of establishing the limit further comprises the step of:

establishing a dull tool limit.

3. The method of claim 2 wherein the step of establishing the dull tool limit comprises the step of establishing the dull tool limit at a maximum allowed value of the average machine energy.

4. The method of claim 1 wherein the step of establishing the limit further comprises the step of:

establishing a broken tool limit.

5. The method of claim 4 wherein the step of establishing the broken tool limit comprises the step of:

establishing the broken tool limit at a minimum allowable value of the relative machine energy.

6. The method of claim 1 wherein the step of establishing the limit further comprises the steps of:

establishing a dull tool limit; and establishing a broken tool limit.

7. The method of claim 1 further comprising the step of:

updating the average machine energy with the total machine energy generated during each consecutive machine cycle.

8. The method of claim 7 further comprising a step of:

determining the average machine energy over a predetermined number of most recent machine cycles.

9. The method of claim 1 wherein the step 1 wherein the step of determining the total machine energy comprises the step of:

integrating the instantaneous machine energy supplied to the spindle at each of a plurality of samples during each machine cycle.

10. An apparatus for determining a tool condition in at least one tool of a plurality of tools in a multiple tool spindle during any of a plurality of successive machine cycles, the apparatus comprising:

means for determining total machine energy supplied to a plurality of machine tools in each of a plurality of consecutive machine cycles;

means for determining the average machine energy supplied in a plurality of consecutive machine cycles;

means for determining relative machine energy of a most recent machine cycle;

means for establishing a limit of at least one of the machine energy and the average machine energy; and means for comparing the relative machine energy with the limit to determine a condition of at least one of the tools of the plurality of machine tools.

11. The apparatus of claim 10 further comprising:

current sense means for detecting the instantaneous electrical current supplied to the multiple tool spindle; and means for detecting a zero crossing of the magnitude of the current.

12. The apparatus of claim 11 further comprising:

processing means, responsive to the current sense means and the zero energy cross detecting means, and operating a stored controlled program, for determining the total machine energy, the average machine energy, the relative machine energy and for comparing one of the relative machine energy and the average machine energy with the limit to detect a tool condition.

* * * * *